United States Patent
Wada et al.

(10) Patent No.: US 6,395,340 B1
(45) Date of Patent: May 28, 2002

(54) COATING COMPOSITION AND METHOD FOR COATING THEREWITH

(75) Inventors: Seiji Wada, Oiso-machi; Satoshi Ikushima, Kashihara; Haruhiko Aida; Hideo Sugai, both of Hiratsuka, all of (JP)

(73) Assignee: Kansai Paint Co., Ltd., Hyogo (JP)

( * ) Notice: Subject to any disclaimer, the term of this patent is extended or adjusted under 35 U.S.C. 154(b) by 0 days.

(21) Appl. No.: 09/529,854

(22) PCT Filed: Oct. 19, 1998

(86) PCT No.: PCT/JP98/04710

§ 371 (c)(1), (2), (4) Date: Apr. 20, 2000

(87) PCT Pub. No.: WO99/20702

PCT Pub. Date: Apr. 29, 1999

(30) Foreign Application Priority Data

Oct. 20, 1997 (JP) ............................................. 9-303361

(51) Int. Cl.$^7$ ................................................. B05D 1/36
(52) U.S. Cl. ........................ 427/410; 428/413; 523/466; 528/403; 528/407; 528/408; 528/418; 528/421
(58) Field of Search ........................... 523/466; 528/403, 528/407, 408, 418, 421; 427/410; 428/413

(56) References Cited

U.S. PATENT DOCUMENTS 5,296,567 A * 3/1994 Baumann ..................... 528/90
6,015,848 A 1/2000 Ikushima et al. ........... 523/427

FOREIGN PATENT DOCUMENTS

| EP | 0 846 739 | 6/1998 |
| JP | 4-180951 | 6/1992 |
| JP | 4-180952 | 6/1992 |
| JP | 10-158580 | 6/1998 |
| WO | 94/27740 | 12/1994 |

* cited by examiner

*Primary Examiner*—Robert Dawson
*Assistant Examiner*—D. Aylward
(74) *Attorney, Agent, or Firm*—Wenderoth, Lind & Ponack, L.L.P.

(57) ABSTRACT

This invention provides a thermosetting organic solvent paint comprising (A) a compound having at least two alicyclic epoxy groups in one molecule and having a number average molecular weight of less than 2000, (B) a secondary amino group-containing compound and (C) a thermolatent cationically polymerizable catalyst and further, under circumstances, (D) colloidal silica, and capable of forming a rigid coating film which is hard, tough and excellent in stain resistance, and from which pollutants, if adhered, are easily removed. This invention further provides a method to form a multi-layered top coating film which comprises applying, to a material to be coated, one or more species of colored paint and one or more species of clear paint in order, said method being characterized in that the above-mentioned paint is used as a clear paint which is to be applied on the uppermost layer.

17 Claims, No Drawings

COATING COMPOSITION AND METHOD FOR COATING THEREWITH

TECHNICAL FIELD

The present invention relates to an organic solvent type thermosetting coating composition capable of forming a rigid coating film having a Tukon hardness (20° C.) of at least 25, excellent in stain resistance, and from which pollutants can easily be removed even when they are adhered, and further relates to a method to form a multilayered topcoating film with use of said coating composition.

BACKGROUND ART

As a topcoat paint (in particular clear paint) for automobile body panel, there are usually used organic solvent type paints which comprise, as main components, hydroxyl group-containing acrylic resin and melamine resin. Although good in weatherability, finished appearance, etc., a coating film made from these paints has yet to have sufficient "acid rain resistance" which has been high-lighted recently. As a topcoat paint which has improved in this acid rain resistance, there have been proposed organic solvent type paints (generally called acid epoxy type paints) which comprise, as main components, carboxyl group-containing resin and epoxy group-containing resin, and which are free of melamine resin. Although excellent in weatherability and finished appearance and also in acid rain resistance, a cured film formed from said acid epoxy type paints has a problem of poor stain resistance which makes it difficult to remove adhered pollutants tracelessly.

The surface of top coating film on outer body panel of automobile which is mostly used outdoors is apt to be stained with pollutants (e.g., bird droppings, pollens, dead insects etc.), iron powder, sand mud, exhaust soot (carbon, paraffin, etc.) which adhere to, soak or sink into said coating film. For example, bird droppings which have stuck on the coating film condense as they are dried and solidified, with the result that the surface of top coating film shrinks together, causing decrease in the appearance of portions concerned, such as gloss and distinctness-of-image-gloss. When wetted with rain etc., pollens and dead insects which have adhered to the coat surface elute protein or amino acid, which may possibly penetrate into the coating film to cause stains. Iron powder, sand mud, exhaust soot etc. also adhere to, or sink into coating film to cause stains.

Automobile body panel, when left outdoors, may raise its temperature to 60° C. or higher by solar heat. Top coating film is softened at such a high temperature, and, thus, staining by the above-mentioned causes becomes more likely to be accelerated.

Once a coating film is stained in such a manner, the stains cannot be removed by simply wiping or using cleanser or wax, and, thus, appearance is damaged.

Thus, the main purpose of the present invention is to provide a novel organic solvent type paint capable of forming a coating film which is equivalent or superior, in weatherability, finished appearance, acid resistance, etc., to coating film of conventional organic solvent type paints (e.g., those which comprise, as main components, acrylic resin and melamine resin, such as acid epoxy type paints) used as an automobile topcoat paint, and which is also good in stain resistance.

DISCLOSURE OF INVENTION

As a result of assiduous study with a view to achieving the above-mentioned purpose, inventors of the present invention have found out that an organic solvent type thermosetting paint which contains a compound having alicyclic epoxy group, a secondary amino group-containing compound and a thermally latent cationically polymerizable catalyst, and, if necessary, colloidal silica as well, gives a coating film which is excellent in crosslinking curing reactivity, and which, once cured, is rigid and hardly softened even when exposed to a temperature of 60° C. or higher, does not allow pollutants to soak or sink into, can easily be freed from pollutants, even though they have stuck, by water washing or dry cloth rubbing without using deter-gents, and, further, is also excellent in weatherability, finished appearance, acid resistance, etc., and thus have completed the present invention.

Thus, the present invention provides an organic solvent type thermosetting paint (hereinafter referred to as "the paint of the present invention") which is characterized by containing (A) a compound with a number-average molecular weight of less than 2000 and having at least two alicyclic epoxy groups in a molecule, (B) a secondary amino group-containing compound and (C) a thermally latent cationically polymerizable catalyst, and, if necessary, (D) colloidal silica as well.

The present invention further provides a coating method (hereinafter referred to as "the coating method of the present invention") which is characterized in that, in a method for forming a multilayered top coating film by coating a substrate with at least one colored paint and at least one clear paint in order, the paint of the present invention is used as a clear paint which is to be uppermost applied.

The paint of the present invention is capable of forming a cured coating film which has a Tukon hardness (20° C.) of at least 25, a breaking stress of at least 500 kg/cm$^2$ and a Young's modulus of at least 20000 kg/cm$^2$. A coating film having these property values is more rigid and tough than film of conventional paints, is hardly softened even when exposed to a temperature of 60° C. or higher, does not allow pollutants to soak or sink into, and can easily be freed from pollutants even though they have stuck, and thus has markedly improved stain resistance.

In this description, "Tukon hardness (20° C.)" value is obtained as follows. A paint is applied on a glass plate so that the cured coating film may have a thickness of 30 µm, and is then heated under a certain condition, for example, at 140° C. for 30 minutes. Thus cured coating film is measured at 20° C. by a TUKON microhardness tester made by American Chain & Cable Company. The larger the value is, the harder is the film. A cured coating film which is formed from known thermosetting paints has usually a Tukon hardness of about 5 to 10. It would be understood therefore how hard a cured film with a Tukon hardness (20° C.) of at least 25 which can be formed by the paint of the present invention is.

"Breaking stress" value is obtained as follows. A paint is applied on a glass plate so that the cured coating film may have a thickness of 30 µm, and is then heated under a certain condition, for example, at 140° C. for 30 minutes. Thus cured coating film is peeled off the glass plate, and is measured at 20° C. by a tensilon meter made by Orientech Corporation. The larger the value is, the higher the strength of the coating film. A cured coating film which is formed from known thermosetting paints has usually a breaking stress of about 300 to 500 kg/cm$^2$. Hence, a coating film with a breaking stress of at least 500 kg/cm$^2$, which can be formed by using the paint of the present invention has a higher breaking stress and is more tough than coating film formed from conventional thermosetting paints.

"Young's modulus" is a value which is measured in a manner similar to the above-mentioned breaking stress. The larger the value is, the higher is the hardness of coating film. A cured coating film which is formed from known thermosetting paints has usually a Young's modulus of about 10000 to 20000 kg/cm$^2$. Hence, a coating film with a Young's modulus of at least 20000 kg/cm$^2$, which can be formed by using the paint of the present invention is more rigid than coating film formed from conventional thermosetting paints.

The paint and coating method of the present invention are described in more detail below.

BEST MODE FOR CARRYING OUT THE INVENTION

The paint of the present invention is an organic solvent type thermosetting paint which is characterized by comprising (A) a compound with a number-average molecular weight of less than 2000 and having at least two alicyclic epoxy groups in a molecule, (B) a secondary amino group-containing compound and (C) a thermally latent cationically polymerizable catalyst, and, if necessary, (D) colloidal silica as well.

Component (A): Compound with a Number-average Molecular Weight of Less than 2000 and Having at Least Two Alicyclic Epoxy Groups in a Molecule "Alicyclic epoxy group" means an oxirane ring (a 3-membered ring constituted by two carbon atoms and an oxygen atom) formed by two adjacent carbon atoms, which constitute a ring of alicyclic hydrocarbon, and by an oxygen atom, and includes neither spiro-type epoxy groups in which the alicyclic hydrocarbon ring and the oxirane ring has only a single carbon atom in common, nor epoxy groups in which an alicyclic hydrocarbon ring and an oxirane ring are connected via another carbon atom. Said alicyclic hydrocarbon can usually be constituted by three to 12, preferably five to six cyclic carbon atoms.

Component (A) is a compound which has 2 or more, preferably 2 to 3, of such alicyclic epoxy groups in a molecule, and which has a number-average molecular weight of less than 2000, preferably 100 to 1500. In general, component (A) has preferably an average epoxy equivalent of 50 to 500, in particular 100 to 300.

Examples of such component (A) include dicyclopentadiene dioxide, bis(2,3-epoxycyclopentyl) ether, epoxycyclohexenecarboxylic acid ethylene glycol diester, bis(3,4-epoxycyclohexylmethyl) adipate, bis(4,5-epoxy-2-methylcyclohexylmethyl) adipate, ethylene glycol-bis(3,4-epoxycyclohexanecarboxylate), 3',4'-epoxycyclohexylmethyl-3,4-epoxycyclohexanecarboxylate, 3,4-epoxy-6-methylcyclohexyl-methyl-3,4-epoxy-6-methylcyclohexanecarboxylate, 1,2,5,6-diepoxy-4,7-methanoperhydroindene, 2-(3,4-epoxycyclohexyl)-3',4'-epoxy-1,3-dioxane-5-spirocyclohexane, 1,2-ethylenedioxy-bis(3,4-epoxycyclohexylmethane), di-2,3-epoxycyclopentyl ether, 4',5'-epoxy-2'-methylcyclohexylmethyl-4,5-epoxy-2-methylcyclohexanecarboxylate, etc.

Component (B): Secondary Amino Group-containing Compound

A compound which ontains one or more, preferably one, secondary amino group. "Secondary amino group" means an amino group (—NHR; R is an organic group such as alkyl group, hydroxyalkyl group, etc.) which has one active hydrogen directly bonded to amino nitrogen. Examples of such a secondary amino group-containing compound include dialkylamine such as dimethylamine, diethylamine, diisopropylamine, dibutylamine; alkanolamine such as diethanolamine, dipropanolamine, di(2-hydroxypropyl) amine, monomethylaminoethanol, N-ethylethanolamine; polyamine such as hydroxyethylaminoethylamine, ethylaminoethylamine, methylaminopropylamine; cyclic amine such as ethyleneimine (aziridine), propyleneimine, piperazine, morpholine. Among them, a compound such as alkanolamine which has both a secondary amino group and a hydroxyl group in a molecule is preferably used since it accelerates the curing reactivity of component (A) to form a more rigid coating film.

Such component (B) which is used for the paint of the present invention has a molecular weight which is preferably at most about 400, in particular in the range of 200 to 400.

Component (C): Thermally Latent Cationically Polymerizable Catalyst

The thermally latent cationically polymerizable catalyst (C) which is used for the paint of the present invention is a compound which, although inactive at room temperature, has an action of cleaving to generate cation when heated to reach critical temperature and thus initiating cationic polymerization. Examples of this component (C) include onium salt of nitrogen, sulfur, phosphorus or iodine each of which has $SbF_6^-$, $BF_4^-$, $AsF_6^-$, $PF_6^-$ as an anionic component. Concretely preferred compounds are as follows:

i) Quaternary Ammonium Salt Type Compounds:

For example, N,N-dimethyl-N-benzylanilinium antimony hexafluoride, N,N-diethyl-N-benzylanilinium boron tetrafluoride, N,N-dimethyl-N-benzylpyridinium antimony hexafluoride, N,N-diethyl-N-benzylpyridinium trifluoromethanesulfonate, N,N-di-methyl-N-(4-methoxybenzyl)pyridinium antimony hexafluoride, N,N-diethyl-N-(4-methoxybenzyl)pyridinium antimony hexafluoride, N,N-diethyl-N-(4-methoxybenzyl)toluidinium antimony hexafluoride, N-α,α-dimethylbenzylpyridinium hexafluoroantimonate, N,N-di-methyl-N-(4-methoxybenzyl)toluidinium antimony hexafluoride.

ii) Sulfonium Salt Type Compounds:

For example, triphenylsulfonium boron tetrafluoride, triphenylsulfonium antimony hexafluoride, triphenylsulfonium arsenic hexafluoride, Adeka CP-66® (made by Asahi Denka Kogyo K. K.), Adeka CP-77® (made by Asahi Denka Kogyo K. K.), tri(4-methoxyphenyl)sulfonium arsenic hexafluoride, benzyltetramethylene-sulfonium hexafluoroantimonate, diphenyl(4-phenylthiophenyl)-sulfonium arsenic hexafluoride.

iii) Phosphonium Salt Type Compounds:

For example, ethyltriphenylphosphonium antimony hexafluoride, tetrabutylphosphonium antimony hexafluoride.

iv) Iodonium Salt Type Compounds:

For example, diphenyliodonium arsenic hexafluoride, di-4-chlorophenyliodonium arsenic hexafluoride, di-4-bromophenyliodonium arsenic hexafluoride, di-p-tolyliodonium arsenic hexafluoride, phenyl(4-methoxyphenyl)iodonium arsenic hexafluoride.

These cationically polymerizable catalysts (C) have a function of cleaving to generate cation when heated to reach critical temperature (for example, about 100 to 180° C., preferably about 120 to 160° C.) for about 10 to 40 minutes, and thus initiating cationic polymerization on the basis of the alicyclic epoxy group of the component (A), and accelerating the crosslinking reaction and three-dimensional curing of component (A).

Component (D): Colloidal Silica

As colloidal silica which is optionally blended in the paint of the present invention, any known ones can be used. Specifically preferable one is in the form of dispersion of ultrafine particles of silicon dioxide ($SiO_2$) suspended in an organic solvent. Said ultrafine particles are preferably of spheric silica which have been rendered high molecular by siloxane bond and which may have hydroxyl groups on their surface. The size of said fine particles is preferably in the range of 2 to 100 nm, in particular 5 to 50 nm.

As organic solvent to suspend these ultrafine particles, any solvent can be used with no particular restriction. Examples of solvent include hydrocarbon type one such as hexane, heptane, xylene, toluene, cyclohexane; ester type one such as methyl acetate, ethyl acetate, acetic acid ethylene glycol monomethyl ether, acetic acid diethylene glycol monomethyl ether; ether type one such as isopropyl ether, ethylene glycol monomethyl ether, diethylene glycol monobutyl ether; alcohol type one such as ethyl alcohol, butyl alcohol, hexyl alcohol; ketone type such as methyl isobutyl ketone, methyl ethyl ketone, isophorone, acetophenone.

In the dispersion of ultrafine particles of silicon dioxide ($SiO_2$) suspended in an organic solvent, the content of said silicon dioxide ultrafine particles is, in general, preferably in the range of 15 to 50% by weight, in particular 20 to 43% by weight.

The dispersion of ultrafine particles of silicon dioxide ($SiO_2$) suspended in an organic solvent, usable in the paint of the present invention, can be obtained on the market. Examples of such a dispersion include Snowtex MA-ST-M®, IPA-ST®, EG-ST®, EG-ST-ZL®, NPC-ST®, DMAC-ST®, MEK®, XBA-ST® and MIBK-ST® (all of which are trademarks of products of Nissan Chemical Industries Co., Ltd.).

Paint of the Present Invention

The paint of the present invention is an organic solvent type thermosetting paint comprising above-mentioned component (A), component (B) and component (C), and, if necessary, component (D) as well. The blending ratio of these components is not particularly restricted but can be selected optionally according to the purpose of use of paint etc. Generally, however, 0.1 to 1 part by weight, particularly 0.3 to 1 part by weight, more desirably 0.5 to 1 part by weight of component (B), 0.05 to 10 parts by weight, particularly 0.25 to 7.5 parts by weight, more desirably 0.5 to 5 parts by weight of component (C), and 10 to 140 parts by weight, particularly 15 to 100 parts by weight, more desirably 20 to 60 parts by weight of component (D) are preferably used per 100 parts by weight of the solid content of component (A).

The paint of the present invention can be prepared, for example, by blending the above-mentioned component (A), component (B) and component (C), and, if necessary, component (D) as well in an organic solvent. Examples of usable organic solvent include toluene, xylene, ethyl acetate, butyl acetate, methyl ethyl ketone, methyl isobutyl ketone, cyclohexanone, isophorone, methanol, ethanol, butanol, carbinol acetate, methoxybutyl acetate, cellosolve, cellosolve acetate, which are however not restrictive.

According to the purpose of use of the paint, usual paint additives such as coloring pigment, iridescent pigment, metallic pigment, extender pigment, ultraviolet absorbent, light stabilizer, fluidity modifier, cissing inhibitor as well as the above-mentioned components may be blended in the paint of the present invention.

The paint of the present invention may be used as solid color paint, metallic paint or iridescent paint. However, since this paint forms a coating film excellent in stain resistance, it is most preferably used as a clear paint with a view to forming the upper-most transparent coating film of a multilayered coating film. For example, the paint of the present invention can be used as the upper-most clear paint in a method of coating a substrate such as automobile body panel with one or more kind of coloring paint and one or more kind of clear paint in order, so as to form a multilayered top coating film.

The present invention thus provides also a method of forming a multilayered top coating film by coating a substrate such as automobile body panel with one or more kind of coloring paint and one or more kind of clear paint successively, which method is characterized by using the paint of the present invention as clear paint to be applied uppermost.

The Coating Method of the Present Invention

The coating method of the present invention is concretely carried out, for example, by the following processes a–c, which are however not restrictive.

Process a: A Process (2-coat process) of Applying a Coloring Paint and a Clear Paint in Order, Wherein the Paint of the Present Invention is Used as a Clear Paint The coloring paint used in the "process a" includes solid color paint, metallic paint and iridescent paint. For this coloring paint, there may be used known thermosetting paints which contain resin component, coloring pigment and solvent.

The resin component used in the above-mentioned coloring paint concretely comprises one or more species of base resin component which are selected from acrylic resin, vinyl resin, polyester resin, alkyd resin, urethane resin, etc. having a crosslinking functional group (e.g., hydroxyl group, epoxy group, carboxyl group, alkoxysilane group), and one or more species of crosslinking agent component to crosslink and cure said base resin component which are selected from alkyl-etherified melamine resin, urea resin, guanamine resin, polyisocyanate compound which may be blocked, epoxy compound, carboxyl group-containing compound etc. These two components are preferably used in the ratio of 50 to 90%, particularly 60 to 85% of the base resin component, and 50 to 10%, particularly 40 to 15% of the crosslinking agent component, based on the total weight.

Coloring pigment includes solid color pigment, metallic pigment and iridescent pigment, which may be used either singly or in combination of two or more of them. As for solvent, although organic solvent type is suitably used, aqueous type may also be used.

"Process a" is suitably conducted by 2-coat- 1-bake process (2C1B) or 2-coat-2-bake process (2C2B) in the following manner: Metal-made or plastic-made automobile substrate is coated with the above-mentioned coloring paint either directly or after said substrate has been coated with primer such as cationically electrodepositable paint and, as need be, further with an intermediate paint and cured. Said coloring paint is applied with airless spray, air spray or electro-static coating so that cured film may have a thickness of about 10 to bout 50 $\mu$m, and is then either heated at about 100 to about 180° C., referably about 120 to about 160° C., for about 10 to about 40 minutes to be crosslinked and cured, or left to stand still at room temperature for several minutes without curing treatment. Then, a clear paint comprising the paint of the present invention is applied in a similar manner so that cured film may have a thickness of about 20 to about 70 μm, and is then heated at about 100 to about 180° C., preferably about 120 to about 160° C., for about 10 to about 40 minutes to be crosslinked and cured.

Process b: A Process (3-coat process) to Apply a Coloring Paint, a First Clear Paint and a Second Clear Paint in Order Wherein the Paint of the Present Invention is Used as a Second Clear Paint As a coloring paint used in this process b, a paint selected from solid color paint, metallic paint and iridescent paint which are described in the above "process a" can be used. First clear paint is a paint for forming a transparent coating film. Either a paint obtained by eliminating most or all of coloring pigment from the above-mentioned coloring paint or the paint of the present invention is usable as this first clear paint. As second clear paint, the paint of the present invention is used.

"Process b" is suitably conducted by 3-coat-1-bake process (3C1B), 3-coat-2-bake process (3C2B) or 3-coat-3-bake process (3C3B) in the following manner: Metal-made or plastic-made automobile substrate is coated with the above-mentioned coloring paint either directly or after said substrate has been coated with primer such as cationically electrodepositable paint and, as need be, further with an intermediate paint and cured. Said coloring paint is applied with airless spray, air spray or electrostatic coating so that cured film may have a thickness of about 10 to about 50 μm, and is then either heated at about 100 to about 180° C., preferably about 120 to about 160° C., for about 10 to about 40 minutes to be crosslinked and cured, or left to stand still at room temperature for several minutes without curing treatment. Then, the coated surface is coated with first clear paint in a similar manner so that so that cured film may have a thickness of about 10 to about 50 μm, and is then either heated at about 100 to about 180° C., preferably about 120 to about 160° C., for about 10 to about 40 minutes to be crosslinked and cured, or left to stand still at room temperature for several minutes without curing treatment. Then, the paint of the present invention as the second clear paint is applied in a similar manner so that cured film may have a thickness of about 10 to about 50 μm, and is then heated at about 100 to about 180° C., preferably about 120 to about 160° C., for about 10 to about 40 minutes to be crosslinked and cured.

Process c: A Coating Process (3-coat process) of Successively Applying a First Coloring Paint, a Second Coloring Paint and a Clear Paint Wherein the Paint of the Present Invention is Used as a Clear Paint As a first coloring paint used in this "process c", a paint selected from solid color paint, metallic paint and iridescent paint which are described in the above "process a" can be used. Particularly preferred are solid color paint and metallic paint which form a coating film which is non-transparent and hides substrate. A second coloring paint is a paint to be applied on the coated surface of the first coloring paint. Although the same coloring paint as described in the above "process a" is usable, it is desirable that the second coloring paint should have a hiding power to such an extent that the color tone (solid color, metallic feeling, light interference pattern, etc.) of the coated surface of the first coloring paint can be visually recognized through the coating film of the second coloring paint. It is therefore preferable that the amount of solid color pigment, metallic pigment or iridescent pigment blended in the second coloring paint is smaller than in the first coloring paint. Clear paint is a paint to form a transparent coating film. The paint of the present invention can be used as a clear paint.

"Process c" is suitably conducted by 3C1B, 3C2B or 3C3B in the following manner: Metal-made or plastic-made automobile substrate is coated with the first coloring paint either directly or after said substrate has been coated with primer such as cationically electrodepositable paint and, as need be, further with an intermediate paint and cured. Said first coloring paint is applied with airless spray, air spray or electrostatic coating so that cured film may have a thickness of about 10 to about 50 μm, and is then either heated at about 100 to about 180° C., preferably about 120 to about 160° C., for about 10 to about 40 minutes to be crosslinked and cured, or left to stand still at room temperature for several minutes without curing treatment. Then, the surface of thus applied first coloring paint is coated with second coloring paint in a similar manner so that so that cured film may have a thickness of about 10 to about 50 μm, and is then either heated at about 100 to about 180° C., preferably about 120 to about 160° C., for about 10 to about 40 minutes to be crosslinked and cured, or left to stand still at room temperature for several minutes without curing treatment. Then, the paint of the present invention as a clear paint is applied in a similar manner so that cured film may have a thickness of about 10 to about 50 μm, and is then heated at about 100 to about 180° C., preferably about 120 to about 160° C., for about 10 to about 40 minutes to be crosslinked and cured.

The afore-mentioned paint and coating method of the present invention show the following effects:

(1) Having no particular need of blending high molecular weight components, the paint of the present invention has good atomization property even though the solid content in the paint, when applied with airless spray, air spray, electrostatic coating, etc., is high (for example, at least 60% by weight, preferably 65 to 80% by weight), with the result that obtained coated surface has excellent smoothness.

(2) The cured coating film formed from the paint of the present invention is equivalent or superior, in weatherability, finished appearance, etc., to a coating film of organic solvent type paint comprising, as main components, hydroxyl group-containing acrylic resin and melamine resin, and, moreover, is remarkably excellent in acid resistance.

(3) The cured coating film formed from the paint of the present invention is equivalent or superior, in acid resistance, weatherability and finished appearance, to a coating film of acid epoxy type paint comprising, as main components, carboxyl group-containing resin and epoxy group-containing resin, and, moreover, is remarkably excellent in stain resistance.

(4) The paint of the present invention is capable of forming a cured coating film which has a Tukon hardness (20° C.) of at least 25, preferably 30 to 40, a breaking stress of at least 500 kg/cm$^2$, preferably 600 to 800 kg/cm$^2$, and a Young's modulus of at least 20000 kg/cm$^2$, preferably 23000 to 28000 kg/cm$^2$. A coating film having these property values is more rigid and tough than film of conventional paints, is hardly softened even when exposed to a temperature of 60° C. or higher, does not allow pollutants to soak or sink into, is capable of inhibiting the promotion of staining, and can easily be freed from pollutants, and thus has markedly improved stain resistance.

(5) Since the cured coating film formed from the paint of the present invention is super-rigid, pollutants (for example, bird droppings, pollens, dead insects), stain-causing substances such as iron powder, sand mud, exhaust soot (carbon, paraffin, etc.) are hard to adhere to the film, and, even though adhered, said substances scarcely soak or sink in the coating film, and are easily wiped away. Hence, gloss and distinctness-of-image-gloss of the portions concerned do not decrease.

(6) Since the cured coating film formed from the paint of the present invention is super-rigid, stuck stains can be easily removed by simply wiping or simple water washing with sponge without using detergent or wax.

(7) The multilayered coating film formed by the method of the present invention is excellent in weatherability, finished appearance such as gloss and distinctness-of-image-gloss, and also in acid resistance and stain resistance.

EXAMPLES

In the following, the present invention is described in more detail by working examples and comparative examples. Incidentally, parts and % are both on the weight basis.

Preparation of Samples

Component (A)

(A-1):

"CEL-2021P" (trademark of a product of Daicel Chemical Industries, Ltd.)

Epoxy equivalent 130, theoretical molecular weight 252
Structural Formula

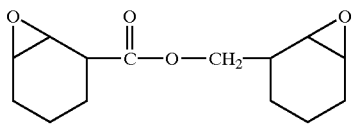

(A-2):

"Epolead GT302" (trademark of a product made by Daicel Chemical Industries, Ltd.)

Epoxy equivalent 240, theoretical molecular weight 634
Structural Formula

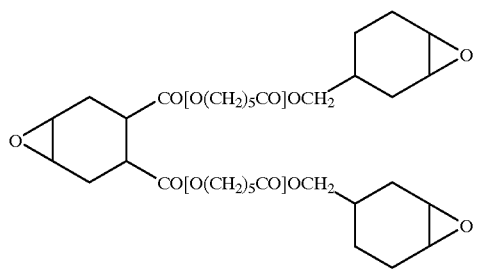

(A-3):

"Denacol EX212" (trademark of a product made by Nagase Chemical Industries, Ltd.)

Epoxy equivalent 150, theoretical molecular weight 230
Structural Formula

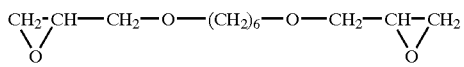

Component (B)

(B-1):

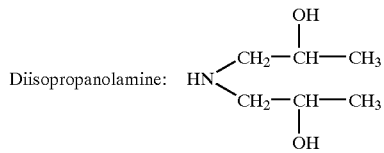

(B-2):

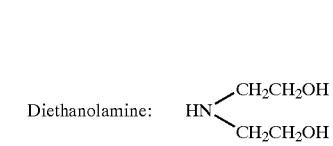

(B-3):

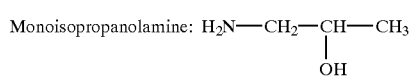

Component (C)

(C-1):

"Sanaid SI-100" (trademark of a product made by Sanshin Chemical Industry Co., Ltd.)

Benzyltetramethylenesulfonium hexafluoroantimonate (C-2):

N-α,α-dimethylbenzylpyridinium hexafluoroantimonate

Component (D)

(D-1):

Snowtex XBA-ST (trademark of a product made by Nissan Chemical Industry, Ltd.)

A suspension in which colloidal silica which has been rendered high-molecular by siloxane bond is suspended in an organic solvent (xylene/butanol). Said colloidal silica has hydroxyl group on its surface, has a spherical shape, and has a particle size of 10 to 20 nm. Solid content is 30%.

Examples 1 to 6

Paints of the present invention were prepared by mixing the above-mentioned components (A)–(D). Blending ratio of these components are shown in Table 1 which is mentioned later.

In Table 1:

1) The amount of each component blended is an amount of solid content.

2) Modaflow is trademark of a surface modifier made by Monsanto Co.

3) "3C2B" under the heading of the coating process is an abbreviation of 3-coat-2-bake process. Concretely, a substrate, which has been coated with a cationically electrodepositable paint and an intermediate paint and heat-cured, is then coated with an organic solvent-based acrylic resin-melamine resin type metallic paint (cured film thickness 20μ) and an organic solvent-based acrylic resin-melamine resin type first clear paint (cured film thickness 25μ), and the films of these paints are heated at 140° C. for 30 minutes to be cured. Subsequently, the paint of the present invention which is obtained in Examples as a second clear paint is applied so that cured film may have a thickness of about 25 μm, and is then heated at 140° C. for 40 minutes, to give a coated plate for test.

"2C1B" is an abbreviation of 2-coat-1-bake process. Concretely, a substrate, which has been coated with a cationically electrodepositable paint and an intermediate paint and heat-cured, is then coated with an organic solvent-based acrylic resin-melamine resin type metallic paint (cured film thickness 20μ), and, without curing treatment, the resultant coated surface is coated with the paint of the present invention, which is obtained in Examples as a clear paint, so that cured film may have a thickness of about 40 μm, and is then heated at 140° C. for 30 minutes so that both of these coating films may be cured, and, thus, a coated plate for test is prepared.

"3C1B" is an abbreviation of 3-coat-1-bake process. Concretely, a substrate, which has been coated with a cationically electrodepositable paint and an intermediate paint and heat-cured, is then coated with an organic solvent-based acrylic resin-melamine resin type metallic paint (cured film thickness 20μ) and an organic solvent-based acrylic resin-melamine resin type first clear paint (cured film thickness 25μ), and, without curing, the paint of the present invention which is obtained in Examples as a second clear paint is applied so that cured film may have a thickness of about 25 μm, and is then heated at 140° C. for 40 minutes so that these three coating films may simultaneously be crosslinked and cured, to give a coated plate for test.

4) "Finished appearance" is a result of visual evaluation of gloss, smoothness, etc. ○ means that they are good, Δ means that they are considerably inferior, and X shows that they are remarkably inferior.

5) "Hardness" is a value measured as follows. A glass plate is coated with a second clear paint so that cured film may have a thickness of 30 μm, and, then, the film is heated at 140° C. for 30 minutes. Thus prepared film is measured, at 20° C. and 60° C., by a Tukon microhardness tester made by American Chain & Cable Company.

6) "Acid resistance" is measured as follows. To a coated surface, 0.4 cc of 40% aqueous solution of sulfuric acid is added dropwise, and is then heated at 60° C. for 15 minutes. After washed with water, the coated surface is visually evaluated. ○ means that no abnormality is observed at all, Δ means that spot trace remains a little, and X shows that dirt, whitening or blister is remarkable.

7) "Stain removability" is measured as follows. A coated plate is sprayed with a test liquid which has been prepared by mixing 0.25 part of carbon black [(12 kinds of test dust made by The Association of Powder Process Industry and Enginnering, Japan)] with 99.75 parts of deionized water and adding sulfuric acid to adjust to pH 3.0. After left to stand still in an atmosphere at a temperature of 20° C. and humidity at 70% for 17 hours, the coated plate is heated at 80° C. for 6 hours by a hot air drier. After this process is repeated four times, the coated plate is water-washed with sponge, and is then visually evaluated. ○ means that no stain is observed at all, Δ means that stain is observed a little, and X means that stain is markedly observed.

8) "Bird dropping resistance" is measured as follows. Pigeon droppings collected outdoors are mixed with deionized water so that the concentration may become 30%. This mixture is stirred with a disper for 30 minutes, and is then filtered with gauze to give a filtrate as a test liquid. To a coated surface, 0.4 cc of the test liquid is applied dropwise, and is then heated a gradient oven at 70° C. for 30 minutes. After water washing, the coated surface is visually evaluated. ○ means that no staining is observed at all, Δ means that stain, cloudiness or blister is observed a little, and X means that stain, cloudiness or blister is remarkably observed.

9) "Pollen resistance" is measured as follows. Pollens of Japanese cedar which have been collected outdoors are mixed with deionized water to give a 0.5 % liquid. To a coated surface, 0.4 cc of this liquid is applied dropwise, and is then heated a gradient oven at 65° C. for 30 minutes. After water washing, the coated surface is visually evaluated. ○ means that no staining is observed at all, Δ means that stain, blister, or shrink is observed a little, and X means that stain, blister or shrink is remarkably observed.

10) "Weatherability" is a result of visual evaluation of a coated surface which has been exposed to Sunshine Weathermeter for 1000 hours. ○ means that no abnormality is observed, Δ means that blister is observed a little, and X means that a lot of blisters are formed.

11) "Breaking stress" is measured as follows. A glass plate is coated with a second clear paint so that cured film may have a thickness of 30 μm, and, then, the film is heated at 140° C. for 30 minutes. Thus prepared film is peeled off the glass plate, and is then measured at 20° C. by a tensilon meter made by Orientech Corporation.

12) "Young's modulus" is a result of measurement conducted in a manner similar to the above breaking stress.

COMPARATIVE EXAMPLES 1 TO 4

Paint compositions for comparison were prepared with use of the afore-mentioned components (A) to (D). The blending proportion of these components is shown in Table 2. In Table 2, the amount of components blended, the mark of 3C2B, etc., have the same meaning as in the above-mentioned Examples. Test method and evaluation criteria are also the same as in the above Examples.

COMPARATIVE EXAMPLE 5

Example 1 was repeated except that "the paint obtained in Examples of the present invention" which was used as second clear paint for 3C2B in Example 1 was replaced with an acid epoxy type clear paint below. Results of performance test are shown in Table 3.
Clear Paint: (Acid Epoxy Type)
A 50% xylene solution of a polymer (an acid group-containing acrylic resin having a number average molecular weight of 6000) which comprised 200 parts of half ester of maleic acid and ethanol, 50 parts of acrylic acid, 200 parts of n-butylacrylate, 350 parts of n-butylmethacrylate and 200 parts of styrene was mixed with a 50% xylene solution of a polymer (an epoxy group-containing acrylic resin having a number average molecular weight of 10000) which comprised 350 parts of glycidylmethacrylate, 130 parts of hydroxyethylmethacrylate, 300 parts of n-butylacrylate, 120 parts of n-butylmethacrylate and 100 parts of styrene, so that the solid content ratio of acid group-containing acrylic resin to epoxy group-containing acrylic resin might be 60 to 40, and, further, tetraethylammonium bromide was added in the proportion of 0.5 part per 100 parts of resin solid content.

COMPARATIVE EXAMPLE 6

Example 1 was repeated except that "the paint obtained in Examples of the present invention" which was used as second clear paint for 3C2B in Example 1 was replaced with a hydroxyl group-containing acrylic resin-melamine resin type clear paint below. Results of performance test are shown in Table 3.

Clear paint: (Hydroxyl Group-containing Acrylic Resin-melamine Resin Type)

A 50 % xylene solution of a polymer (a hydroxyl group-containing acrylic resin having a number average molecular weight of 5000) which comprised 200 parts of styrene, 200 parts of hydroxyethylmethacrylate, 200 parts of n-butylacrylate, 300 parts of n-butylmethacrylate and 100 parts of 2-ethylhexylacrylate was mixed with a melamine resin ("U-Van 20SE-60", a butyletherified melamine resin manufactured by Mitsui Toatsu Co.), so that the solid content ratio of hydroxyl group-containing acrylic resin to melamine resin might be 60 to 40.

TABLE 1

| | Examples | | | | | |
|---|---|---|---|---|---|---|
| | 1 | 2 | 3 | 4 | 5 | 6 |
| (A-1) | 100 | | 100 | 100 | 100 | 100 |
| (A-2) | | 100 | | | | |
| (B-1) | 0.1 | | 0.1 | | 0.1 | |
| (B-2) | | 0.1 | | 0.1 | | 0.1 |
| (C-1) | 0.5 | | 0.5 | | 0.5 | 0.5 |
| (C-2) | | 1 | | 1 | | |
| (D-1) | | | 40 | 40 | 100 | 100 |
| Modaflow | 0.2 | 0.2 | 0.2 | 0.2 | 0.2 | 0.2 |
| Coating process | 3C2B | 3C2B | 3C2B | 3C2B | 2C1B | 3C1B |
| Finished appearance | ○ | ○ | ○ | ○ | ○ | ○ |
| Hardness | | | | | | |
| 20° C. | 28 | 26 | 32 | 30 | 35 | 36 |
| 60° C. | 17 | 15 | 22 | 20 | 24 | 25 |
| Acid resistance | ○ | ○ | ○ | ○ | ○ | ○ |
| Stain removability | ○ | ○ | ○ | ○ | ○ | ○ |
| Bird dropping resistance | ○ | ○ | ○ | ○ | ○ | ○ |
| Pollen resistance | ○ | ○ | ○ | ○ | ○ | ○ |
| Weatherability | ○ | ○ | ○ | ○ | ○ | ○ |
| Breaking stress (kg/cm$^2$) | 580 | 570 | 620 | 600 | 670 | 650 |
| Young's modulus (kg/cm$^2$) | 24000 | 23000 | 27000 | 26000 | 29000 | 29000 |

TABLE 2

| | Comparative Examples | | | |
|---|---|---|---|---|
| | 1 | 2 | 3 | 4 |
| (A-1) | 100 | 100 | — | — |
| (A-3) | — | — | 100 | 100 |
| (B-3) | — | 0.1 | 0.1 | 0.1 |
| (C-1) | 0.5 | 0.5 | 0.5 | 0.5 |
| (D-1) | — | 40 | 40 | 100 |
| Modaflow | 0.2 | 0.2 | 0.2 | 0.2 |
| Coating process | 3C2B | 3C2B | 3C2B | 3C2B |
| Finished appearance | ○ | ○ | ○ | ○ |
| Hardness | | | | |
| 20° C. | 25 | 21 | 19 | 16 |
| 60° C. | 14 | 12 | 10 | 7 |
| Acid resistance | ○ | ○ | ○ | Δ |
| Stain removability | ○ | ○ | Δ | Δ |
| Bird dropping resistance | ○ | ○ | ○ | × |
| Pollen resistance | ○ | ○ | ○ | Δ |
| Weatherability | Δ | × | × | × |
| Breaking stress (kg/cm$^2$) | 450 | 460 | 440 | 410 |
| Young's modulus (kg/cm$^2$) | 20000 | 18000 | 17000 | 15000 |

TABLE 3

| | Comparative Examples | |
|---|---|---|
| | 5 | 6 |
| Coating process | 3C2B | 3C2B |
| Finished appearance | ○ | ○ |
| Hardness | | |
| 20° C. | 10 | 9 |
| 60° C. | 2 | 2 |
| Acid resistance | ○ | × |
| Stain removability | Δ | × |
| Bird dropping resistance | × | × |
| Pollen resistance | × | × |
| Weatherability | ○ | ○ |
| Breaking stress (kg/cm$^2$) | 400 | 400 |
| Young's modulus (kg/cm$^2$) | 12000 | 11000 |

What is claimed is:

1. A thermosetting organic solvent paint which comprises (A) a compound having at least two alicyclic epoxy groups in one molecule and having a number average molecular weight of less than 2000, (B) a secondary amino group-containing compound which has a hydroxyl group and (C) a thermolatent cationically polymerizable catalyst.

2. A paint of claim 1 wherein the component (A) has a number average molecular weight of less than 2000 and an average epoxy equivalent of 50 to 500.

3. A paint of claim 2 wherein the component (A) has a number average molecular weight of 100 to 1500 and an average epoxy equivalent of 100 to 300.

4. A paint of claim 1 wherein the component (B) has a number average molecular weight of 200 to 400.

5. A paint of claim 1 wherein the component (C) is a quaternary ammonium salt, a sulfonium salt, a phosphonium salt or an iodonium salt each of which has $SbF_6^-$, $BF_4^-$, $AsF_6^-$ or $PF_6^-$, as an anionic component.

6. A paint of claim 1 which contains 0.1 to 1 part by weight of component (B) and 0.05 to 10 parts by weight of component (C) per 100 parts by weight of solid content of component (A).

7. A paint of claim 1 which further comprises (D) colloidal silica.

8. A paint of claim 7 wherein component (D) is blended in the form of a dispersion of spheric ultrafine particles of silicon dioxide suspended in an organic solvent, said silicon dioxide having been rendered high-molecular by means of siloxane bond.

9. A paint of claim 8 wherein the size of the spheric ultrafine particles is in the range of 2 to 100 nm.

10. A paint of claim 7 which comprises 10 to 140 parts by weight of component (D) per 100 parts by weight of solid content of component (A).

11. A paint of claim 1 which forms a cured coating film having a TUKON hardness (20° C.) of at least 25, a breaking stress of at least 500 kg/cm$^2$ and a Young's modulus of at least 20000 kg/cm$^2$.

12. A cured coating film formed from the paint of claim 1, said film having a TUKON hardness (20° C.) of at least 25, a breaking stress of at least 500 kg/cm² and a Young's modulus of at least 20000 kg/cm².

13. A paint of claim 7 which forms a cured coating film having a TUKON hardness (20° C.) of at least 25, a breaking stress of at least 500 kg/cm² and a Young's modulus of at least 20000 kg/cm².

14. A method to form a multilayered top coating film which comprises applying, to a material to be coated, one or more species of colored paint and one or more species of clear paint in order, said method being characterized in that a thermosetting organic solvent paint which is mentioned in any one of claims 1 to 4, 6 to 12 or 13 is used as a clear paint which is to be applied on the uppermost layer.

15. A method of claim 14 wherein the material to be coated is an automobile body.

16. An article which is coated by the method of claim 14.

17. A cured coating film formed from the paint of claim 7, said film having a TUKON hardness (20° C.) of at least 25, a breaking stress of at least 500 kg/cm² and a Young's modulus of at least 20000 kg/cm².

* * * * *